(12) United States Patent
Eash et al.

(10) Patent No.: US 12,099,198 B2
(45) Date of Patent: Sep. 24, 2024

(54) WAVEGUIDE ILLUMINATION OF A SPATIAL LIGHT MODULATOR

(71) Applicant: Avegant Corp., San Mateo, CA (US)

(72) Inventors: Aaron Matthew Eash, San Francisco, CA (US); Andrew John Gross, Chassell, MI (US); Edward Chia Ning Tang, Menlo Park, CA (US); Warren Cornelius Welch, III, Foster City, CA (US); Joseph Daniel Lowney, Tucson, AZ (US)

(73) Assignee: Avegant Corp., San Mateo, CA (US)

( * ) Notice: Subject to any disclaimer, the term of this patent is extended or adjusted under 35 U.S.C. 154(b) by 0 days.

(21) Appl. No.: 18/357,873

(22) Filed: Jul. 24, 2023

(65) Prior Publication Data

US 2024/0027773 A1    Jan. 25, 2024

Related U.S. Application Data

(63) Continuation of application No. 17/173,140, filed on Feb. 10, 2021, now Pat. No. 11,709,363.

(60) Provisional application No. 62/972,633, filed on Feb. 10, 2020.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0028* (2013.01); *G02B 6/0038* (2013.01); *G02B 6/0055* (2013.01)

(58) Field of Classification Search
CPC ...... G02B 6/00; G02B 6/0016; G02B 6/0028; G02B 6/0038; G02B 6/0055; G02B 27/0172

See application file for complete search history.

(56) References Cited

U.S. PATENT DOCUMENTS

| 6,222,677 | B1 | 4/2001 | Budd et al. |
| 6,633,350 | B2 | 10/2003 | Sasakura et al. |
| 6,850,221 | B1 | 2/2005 | Tickle |
| 6,922,267 | B2 | 7/2005 | Endo et al. |
| 7,206,107 | B2 | 4/2007 | Levola |
| 7,418,170 | B2 | 8/2008 | Mukawa et al. |

(Continued)

FOREIGN PATENT DOCUMENTS

| CN | 104145208 A | 11/2014 |
| CN | 105229514 A | 1/2016 |

(Continued)

OTHER PUBLICATIONS

ARToolKit: Hardware, retrieved via Internet: www.hitl.washington.edu/artoolkit/documentation/hardware.htm, retrieved Apr. 25, 2022, 3 pages.

(Continued)

*Primary Examiner* — Tina M Wong
(74) *Attorney, Agent, or Firm* — Nicholson De Vos Webster & Elliott LLP; Judith Szepesi (57) ABSTRACT

A system comprising a waveguide including an in-coupler and an out-coupler, and a digital micromirror device (DMD) to receive the light from the waveguide via the out-coupler, and to direct modulated light through the waveguide, the modulated light passing through the waveguide before being directed toward a user's eye.

20 Claims, 13 Drawing Sheets

(56) References Cited

U.S. PATENT DOCUMENTS

| | | | |
|---|---|---|---|
| 7,436,568 | B1 | 10/2008 | Kuykendall, Jr. |
| 7,710,655 | B2 | 5/2010 | Freeman et al. |
| 7,738,053 | B2 | 6/2010 | Kubota |
| 8,310,764 | B2 | 11/2012 | Tanijiri |
| 9,664,905 | B2 | 5/2017 | Bohn et al. |
| 9,779,512 | B2 | 10/2017 | Tomlin et al. |
| 10,156,896 | B2 | 12/2018 | Lee et al. |
| 10,302,835 | B2 | 5/2019 | Danziger |
| 10,732,442 | B2 | 8/2020 | Hsu et al. |
| 2002/0167733 | A1 | 11/2002 | Roest |
| 2003/0038911 | A1 | 2/2003 | Tanada et al. |
| 2003/0165067 | A1 | 9/2003 | Imamura et al. |
| 2004/0184717 | A1 | 9/2004 | Koontz et al. |
| 2006/0028436 | A1 | 2/2006 | Armstrong |
| 2006/0164607 | A1 | 7/2006 | Morejon et al. |
| 2007/0081123 | A1 | 4/2007 | Lewis |
| 2007/0177275 | A1 | 8/2007 | McGuire, Jr. |
| 2011/0018903 | A1 | 1/2011 | Lapstun et al. |
| 2012/0127062 | A1 | 5/2012 | Bar-Zeev et al. |
| 2012/0162549 | A1 | 6/2012 | Gao et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0127980 | A1 | 5/2013 | Haddick et al. |
| 2013/0208234 | A1 | 8/2013 | Lewis |
| 2013/0222384 | A1 | 8/2013 | Futterer |
| 2013/0242262 | A1 | 9/2013 | Lewis |
| 2013/0242392 | A1 | 9/2013 | Amirparviz et al. |
| 2014/0063054 | A1 | 3/2014 | Osterhout et al. |
| 2014/0071539 | A1 | 3/2014 | Gao |
| 2014/0140654 | A1 | 5/2014 | Brown et al. |
| 2014/0177023 | A1 | 6/2014 | Gao et al. |
| 2014/0211322 | A1 | 7/2014 | Bohn et al. |
| 2014/0218468 | A1 | 8/2014 | Gao et al. |
| 2014/0240351 | A1 | 8/2014 | Scavezze et al. |
| 2014/0267420 | A1 | 9/2014 | Schowengerdt et al. |
| 2014/0293434 | A1 | 10/2014 | Cheng et al. |
| 2014/0300966 | A1 | 10/2014 | Travers et al. |
| 2014/0306866 | A1 | 10/2014 | Miller et al. |
| 2014/0320755 | A1 | 10/2014 | Martinez et al. |
| 2014/0347736 | A1 | 11/2014 | Liu et al. |
| 2015/0002528 | A1 | 1/2015 | Bohn et al. |
| 2015/0003796 | A1 | 1/2015 | Bennett |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0293358 | A1 | 10/2015 | De et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0067087 | A1 | 3/2016 | Tedford et al. |
| 2016/0077338 | A1 | 3/2016 | Robbins et al. |
| 2016/0131898 | A1 | 5/2016 | Chen et al. |
| 2016/0147003 | A1* | 5/2016 | Morozov ............... G02B 27/10 362/613 |
| 2016/0334562 | A1 | 11/2016 | Richards et al. |
| 2017/0010466 | A1 | 1/2017 | Klug et al. |
| 2017/0059879 | A1 | 3/2017 | Vallius |
| 2017/0219841 | A1 | 8/2017 | Popovich et al. |
| 2017/0242249 | A1 | 8/2017 | Wall et al. |
| 2017/0242264 | A1 | 8/2017 | Sissom |
| 2017/0248750 | A1 | 8/2017 | Curtis et al. |
| 2017/0255020 | A1 | 9/2017 | Tam et al. |
| 2017/0276940 | A1 | 9/2017 | Popovich et al. |
| 2017/0299869 | A1 | 10/2017 | Urey et al. |
| 2017/0322419 | A1 | 11/2017 | Tekolste et al. |
| 2018/0045965 | A1 | 2/2018 | Schowengerdt |
| 2018/0074457 | A1 | 3/2018 | Jolly et al. |
| 2018/0196271 | A1 | 7/2018 | Hong et al. |
| 2018/0292654 | A1 | 10/2018 | Wall et al. |
| 2018/0338131 | A1 | 11/2018 | Robbins |
| 2018/0341223 | A1 | 11/2018 | Shestak et al. |
| 2018/0364486 | A1 | 12/2018 | Ding et al. |
| 2019/0041634 | A1 | 2/2019 | Popovich et al. |
| 2019/0179149 | A1 | 6/2019 | Curtis et al. |
| 2019/0272802 | A1 | 9/2019 | Haba et al. |
| 2020/0019000 | A1 | 1/2020 | Hsu et al. |
| 2020/0142121 | A1 | 5/2020 | Vasylyev |
| 2020/0142356 | A1 | 5/2020 | Gilles et al. |
| 2020/0159026 | A1 | 5/2020 | Waldern et al. |
| 2020/0341281 | A1 | 10/2020 | Woods |
| 2020/0409156 | A1 | 12/2020 | Sissom et al. |
| 2021/0333629 | A1 | 10/2021 | Nichol et al. |
| 2022/0004009 | A1 | 1/2022 | Myhre et al. |
| 2022/0283371 | A1 | 9/2022 | Tekolste et al. |

FOREIGN PATENT DOCUMENTS

| | | |
|---|---|---|
| CN | 104614858 B | 2/2017 |
| CN | 108700748 A | 10/2018 |
| JP | 2001-264682 A | 9/2001 |
| JP | 2003-091002 A | 3/2003 |
| WO | 2019/118357 A1 | 6/2019 |
| WO | 2019/178060 A1 | 9/2019 |
| WO | 2020/112836 A1 | 6/2020 |
| WO | 2020/115735 A1 | 6/2020 |
| WO | 2020/139752 A1 | 7/2020 |

OTHER PUBLICATIONS

Azuma, "A Survey of Augmented Reality," Teleoperators and Virtual Environments 6, 4 (Aug. 1997), pp. 355-385. https://web.archive.org/web/20010604100006/http://www.cs.unc.edu/-azuma/ARpresence.pdf.

Azuma, "Predictive Tracking for Augmented Realty," TR95-007, Department of Computer Science, UNG-Chapel Hill, NC, Feb. 1995.

Bimber, et al., "Spatial Augmented Reality—Merging Real and Virtual Worlds," 2005 https://web.media.mit.edu/-raskar/book/BimberRaskarAugmentedRealityBook.pdf.

Jacob, "Eye Tracking in Advanced Interface Design," Human-Computer Interaction Lab Naval Research Laboratory, Washington, D.C. I paper/ in Virtual Environments and Advanced Interface Design, ed. by W. Barfield and T.A. Furness, pp. 258-288, Oxford University Press, New York (1995).

Kano, Machine Translation of JP-2003091002-A, Mar. 2003. (Year: 2003).

Non-Final Office Action, U.S. App. No. 17/173,140, Oct. 18, 2022, 9 pages.

Notice of Allowance, U.S. Appl. No. 17/173,140, Mar. 7, 2023, 10 pages.

Notice of Allowance, U.S. Appl. No. 17/173,140, Mar. 15, 2023, 2 pages.

TANRIVERDI and JACOB, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

WAVEGUIDE ILLUMINATION OF A SPATIAL LIGHT MODULATOR

RELATED APPLICATION

The present application is a continuation of U.S. application Ser. No. 17/173,140, filed Feb. 10, 2021, issuing as U.S. Pat. No. 11,709,363 on Jul. 25, 2023, which application claims priority to U.S. Provisional Application No. 62/972,633 filed on Feb. 10, 2020, and incorporated in its entirety herein.

FIELD OF INVENTION

The present application is related to head-mounted displays, and in particular to utilizing a spatial light modulator including a waveguide.

BACKGROUND

For most head-mounted displays, the system includes a set of optics, through which light is directed to a digital micromirror device (DMD). The optics generally include a prism and one or more lenses to focus the light. The DMD reflects the light through another set of optics. The second set of optics, directing the light from the DMD to the user's eye, may include one or more lenses, and optionally a waveguide.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION

A system including a waveguide is described, which may in some embodiments be used in head-mounted devices (HMDs) for displaying augmented and/or virtual reality images to a user. The use of a waveguide to direct light to a DMD is advantageous because it replaces the prism and optics generally used to direct such light. This enables a lighter weight and thinner display system. This is particularly useful in HMDs, where total weight is an important consideration. Additionally, it has advantages in optical efficiency.

The present system may be used for augmented reality, virtual reality, and/or mixed reality displays. Virtual reality (VR) displays virtual objects only, either in an interactive or non-interactive system. Augmented reality (AR) overlays virtual objects over the real-world environment. Mixed reality (MR) overlays virtual objects, and anchors them to objects in the real world. The present system may be used in any of these types of displays.

Figure 1:
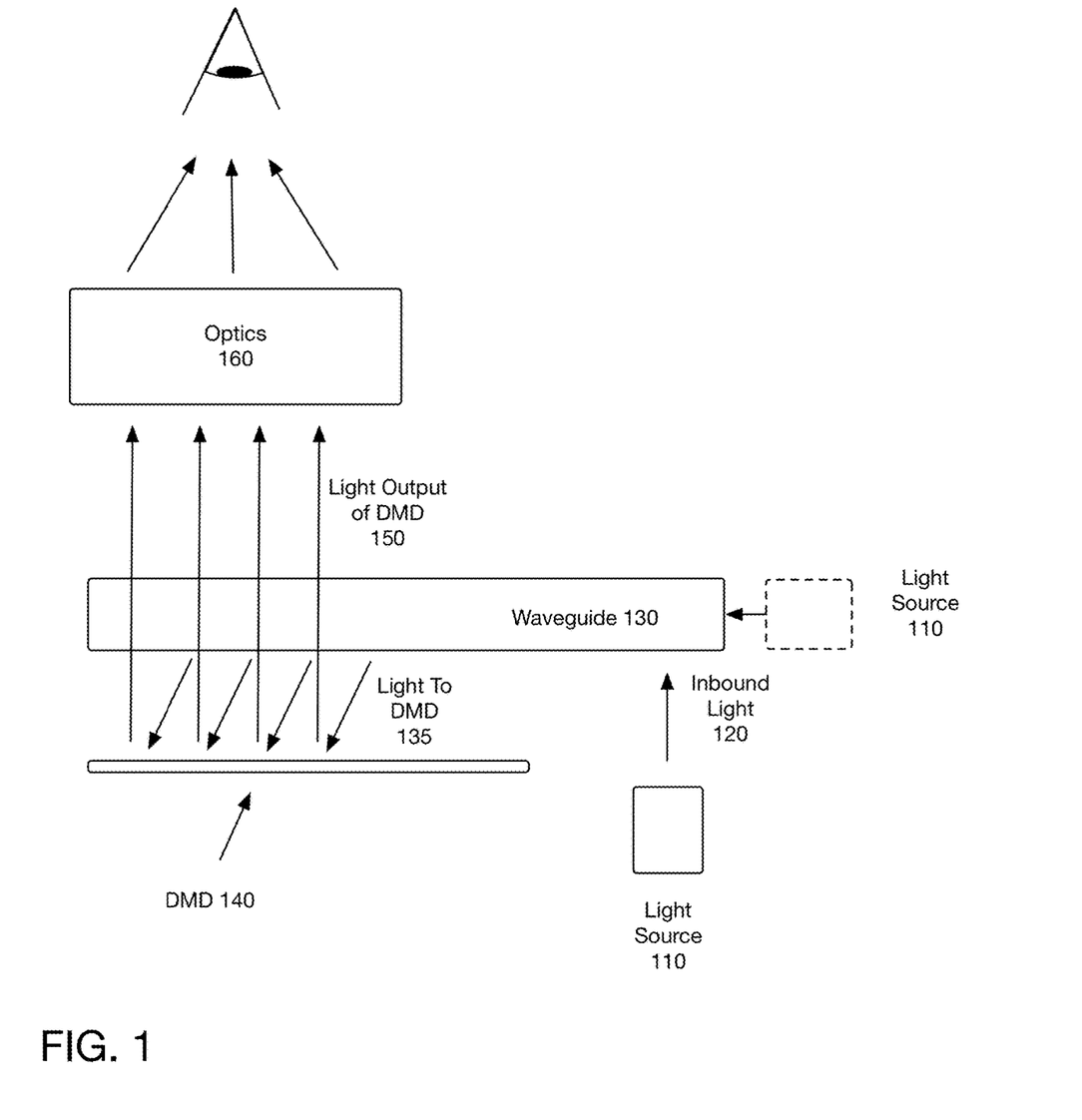
FIG. 1 is a block diagram of one embodiment of the system including the waveguide.

FIG. 1 illustrates one embodiment of the system. The system includes, in one embodiment, a light source 110 projecting a light 120 into a waveguide 130. The light source 110 may be coherent or non-coherent. In general, "coherent light" is temporally, spatially, and spectrally coherent. In one embodiment, coherent light sources include lasers. In one embodiment, non-coherent light sources may include sources such as light emitting diodes (LEDs), superluminescent diodes (sLED), microLEDs, or non-time coherent lasers. In one embodiment, the light source 110 may be temporally coherent. In one embodiment, the light source 110 may be spatially coherent. In one embodiment, the light source 110 may propagate to the waveguide 130 through fiber optics.

The waveguide 130, in one embodiment, is a planar waveguide. In one embodiment, the waveguide 130 has a diffractive element for in-coupling and out-coupling. The diffractive element, in one embodiment, is a diffractive grating. In another embodiment, the diffractive element may be a holographic optical element (HOE). In one embodiment, as will be shown below, the diffractive element for in-coupling may be replaced by a non-diffractive in-coupler. In one embodiment, as will be shown below, the diffractive element for out-coupling may be replaced by a non-diffractive out-coupler.

The waveguide 130 directs the light to a spatial light modulator 140. In one embodiment, light from the waveguide impacts the spatial light modulator. In one embodiment, the spatial light modulator is a digital micromirror device (DMD) 140. The light output 150 modulated by the DMD 140 passes through the waveguide 130, in one embodiment. The light output 150 from DMD 140 is not coupled into the waveguide 130 but rather passes through it.

The light output 150 is then optionally directed through optics 160, to the user's eye. In one embodiment, optics 160 may include a second waveguide to redirect the light. This system is particularly useful in head-mounted devices, where the reduced size and weight resulting from the replacement of some of the optics with a waveguide 130 is particularly beneficial.

Although the alignment of the elements shown here may be used, the light may be redirected using mirrors, waveguides, fiber optics, or other optical elements, without departing from the scope of the present application.

Figures 2A, 2B:
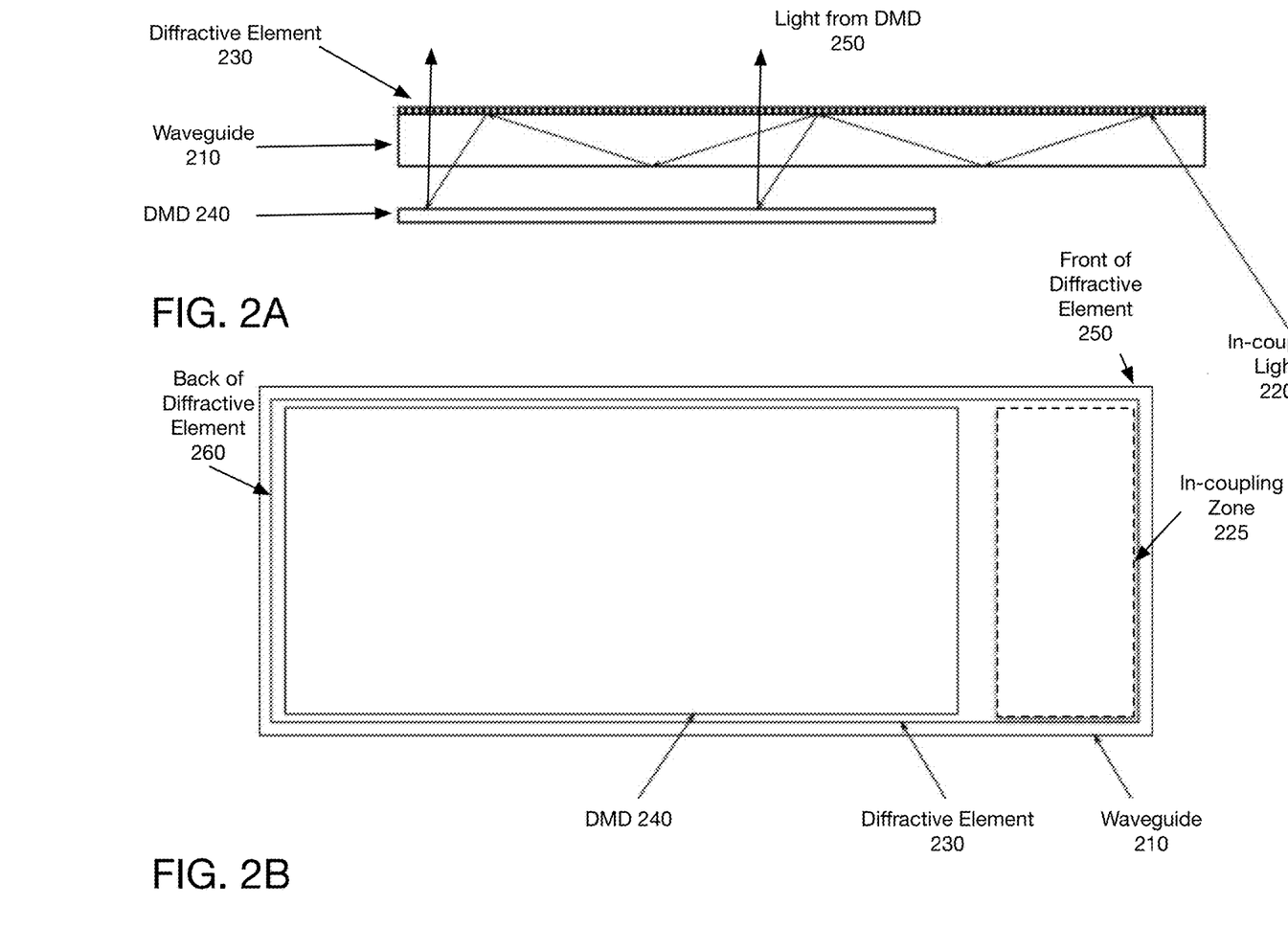
FIG. 2A illustrates a side view of a first embodiment of the waveguide, including a single grating.
FIG. 2B is a top view of the first embodiment of the single grating waveguide.

FIG. 2A illustrates a side view of a first embodiment of the waveguide, including a single grating which functions as both an in-coupler and an out-coupler. The waveguide 210 receives light 220 from a light source (not shown). The light may be coherent light or non-coherent light. The light 220 is coupled into the waveguide 210 via single diffractive element 230. The single diffractive element 230, in one embodiment, extends along the length of the waveguide. In another embodiment, the single diffractive element 230 extends along a majority, but not the entirety, of the waveguide 210. In one embodiment, the single diffractive optical element 230 is a surface relief grating with a uniform period.

In one embodiment, the depth of the surface relief grating (SRG) varies within the diffractive element 230. One method to adjust the uniformity (how much light is coupling out) of an SRG grating is to vary its depth. As light travels down the waveguide and interacts with an SRG, in one embodiment, the SRG starts with low out-coupling efficiency—almost complete total internal reflection (TIR)—and ramps towards high out-coupling efficiency (out-coupling almost all of the light interacting with the grating). The varying of grating depths can tune the uniformity of the light coming out along the grating. The change in the grating depth may be linear or non-linear. In one embodiment, the SRG's out-coupling efficiency changes continuously, between 1% and 99% efficiency. In another embodiment, the SRG's out-coupling efficiency changes stepwise. In one embodiment, the minimum out-coupling efficiency is between 0% and 5%, while the maximum out-coupling efficiency is between 20% and 100%.

In another embodiment the diffractive element 230 is a volume hologram. In one embodiment, the out-coupling efficiency of the volume hologram is varied, starting with a low out-coupling efficiency and ramping toward an almost complete out-coupling efficiency.

The light is in-coupled using the single diffractive element 230, and out-coupled through the length of the diffractive element 230, to the DMD 240. In one embodiment, the size of the waveguide 210 is between 10 mm and 30 mm, and between 50% and 90% of the waveguide is covered by diffractive gratings. In one embodiment, the waveguide is 18 mm, 75% of which is covered by the diffractive element. In one embodiment, the waveguide 210 is larger than the DMD. In one embodiment, the waveguide is 130% of the size of the DMD 240.

The DMD 240 directs the light 250 through the waveguide 210. However, the light from the DMD 240 is not coupled into the waveguide 210 but rather passes through the waveguide. This is due to the fill factor and angle of incidence of the light. The light from the DMD mostly passes through the waveguide because the DMD mirrors change the angle of incidence of the light from less than the TIR condition to close to 90°. At this large angle of incidence, the light mostly passes through the diffractive grating. In one embodiment, a small portion of the light is in-coupled into the waveguide. However, this lost light does not significantly impact the optical results. In one embodiment, the waveguide 210 passes the light from the DMD 240 through to the user's eye (optionally through additional optical elements, not shown).

FIG. 2B is a top view of the first embodiment of the single grating waveguide shown in FIG. 2A. The view shows the stacked elements to illustrate their relative sizes. As can be seen, the size of the waveguide 210 is larger than the size of the DMD 240. The surface grating 230 also extends beyond the length of the DMD 240, in one embodiment. In one embodiment, this enables the light to be in-coupled into the waveguide 210 in an in-coupling zone 225, a portion of the waveguide 210 that does not overlap the DMD 240. In one embodiment, when the light hits the diffractive element 230, a portion of the light is out-coupled, while the rest of the light is reflected internally. In one embodiment, the variation in the diffractive element along the waveguide 210 has a smaller portion of the light out-coupled at the front of the diffractive element 250, and a larger portion toward the back of the diffractive element 260. In one embodiment, the percentage of light that is out-coupled depends on the configuration of the grating and the angle of interaction of the light. In one embodiment, between 0% and 10% of the light is lost through leaky gratings. This includes light that is not coupled out through the out-coupling grating, and light that is coupled into the waveguide when the light is passing through the waveguide from the DMD 240. However, this level of lost light does not cause any issues in the system.

In this way, the light is out-coupled to the DMD 240 from the waveguide 210 through the length of the DMD.

Figure 3A:
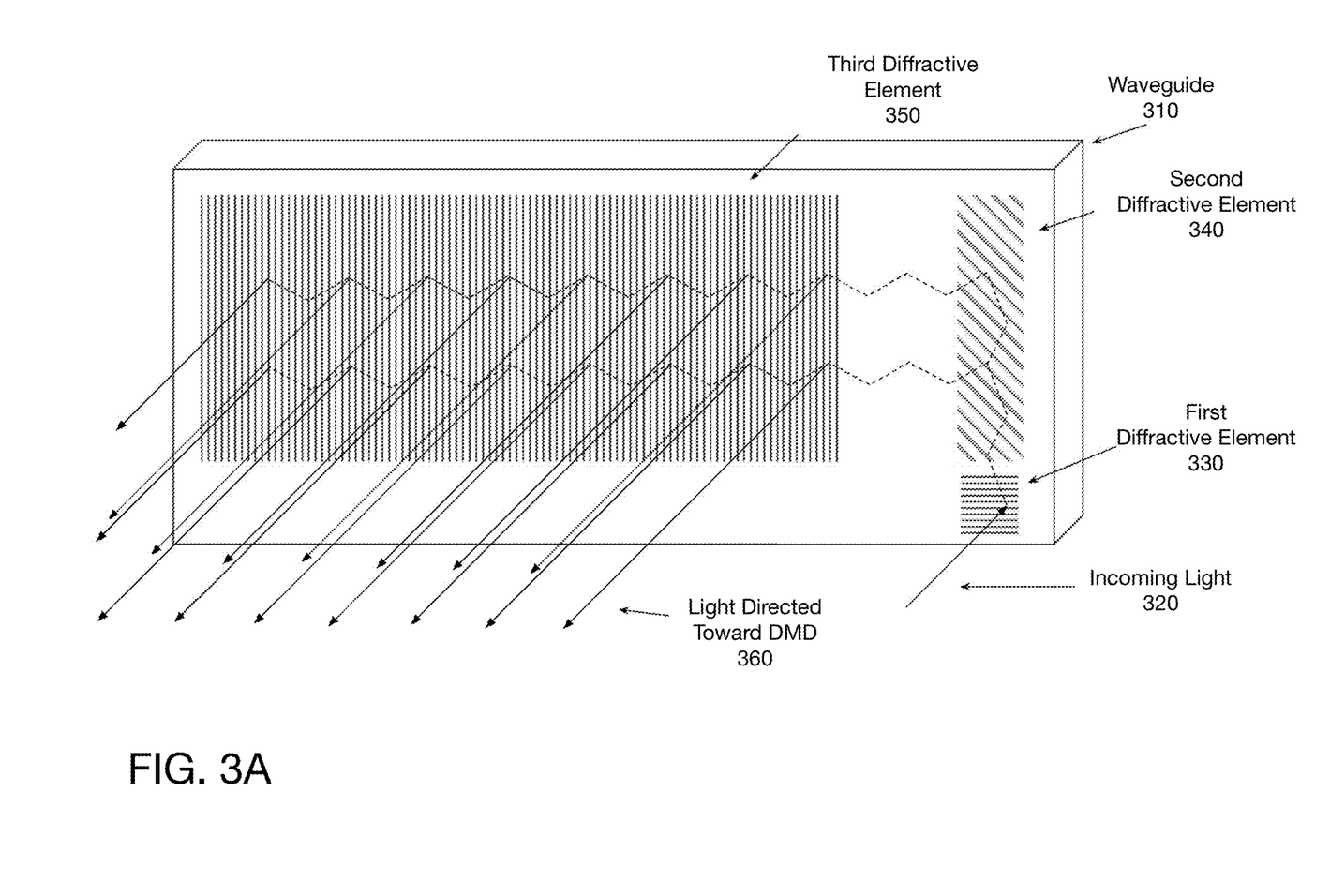
FIG. 3A is a top view of a second embodiment of the waveguide, including three gratings.
Figure 3B:
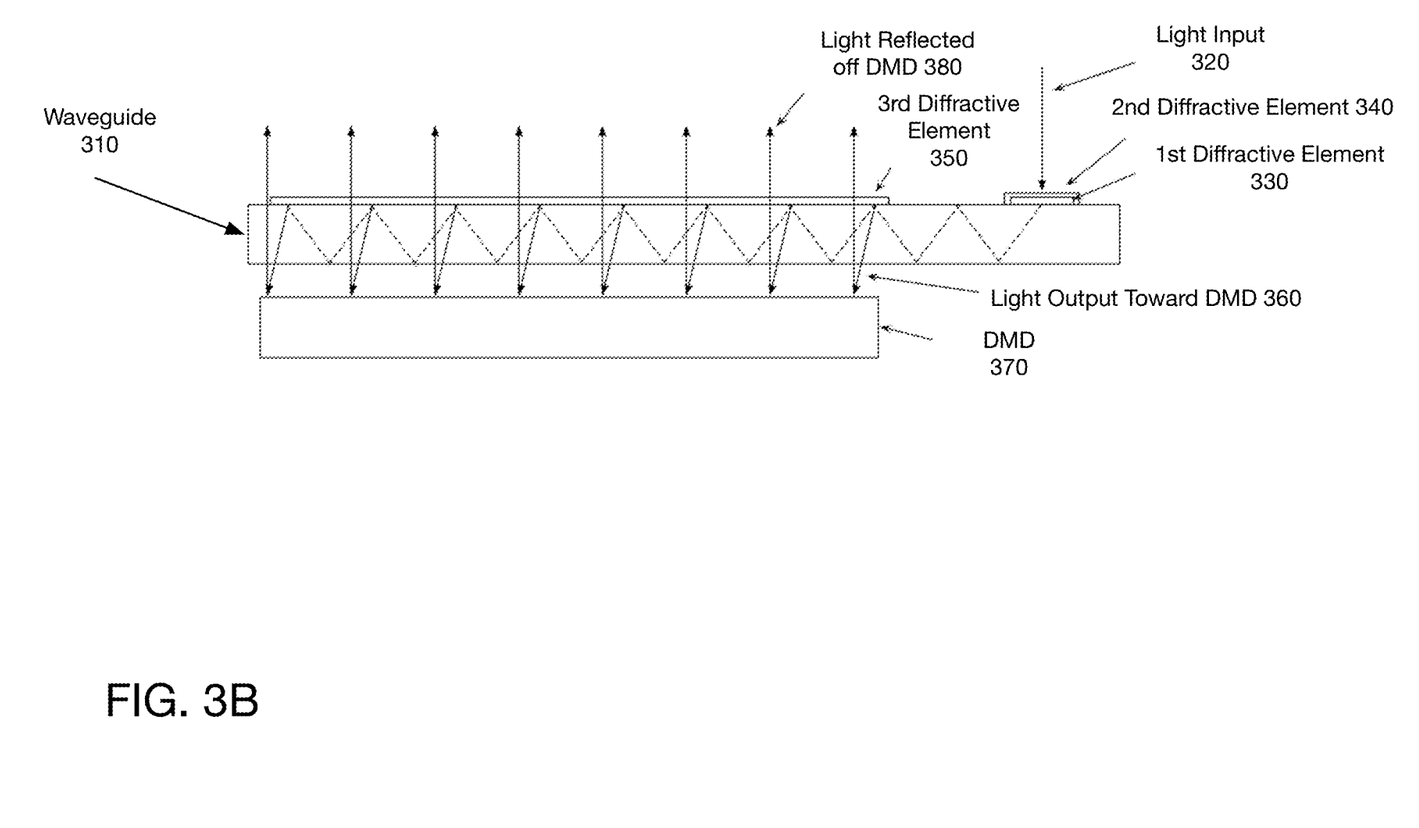
FIG. 3B is a side view of the second embodiment of the waveguide including three gratings.

FIG. 3A is a top view of a second embodiment of the waveguide 310, including three diffractive elements. FIG. 3B is a side view of this embodiment of the waveguide. In this embodiment, a first diffractive element 330 is used to in-couple the light 320 into the waveguide 310, toward the second diffractive element 340.

The second diffractive element 340 does not in-couple or out-couple the light, but rather expands the beam and directs the light toward the third diffractive element 350. The third diffractive element 350 directs the beam to a micromirror display 370 at the correct angle. The DMD 370 reflects the modulated light 380, which passes through the waveguide 310 and to the user's eye, optionally through some additional optics.

The diffractive elements 330, 340, 350 may be surface relief gratings or volume holograms. This configuration enables the spacing out of the inputs for placement of light source, which is physically advantageous. Having the second diffractive element 340 for beam expansion helps with uniformity, as well as reducing the size requirements of the input light source. In one embodiment, the use of the expanding diffractive element enables the use of a smaller input light source. This reduces size and power requirements for the light source. Although the side view shows a height, and height differences, between the diffractive elements, that is done for visual distinctiveness. In a real configuration, a diffractive element may be fabricated on the waveguide 310 and not add significant height.

Figure 4A:
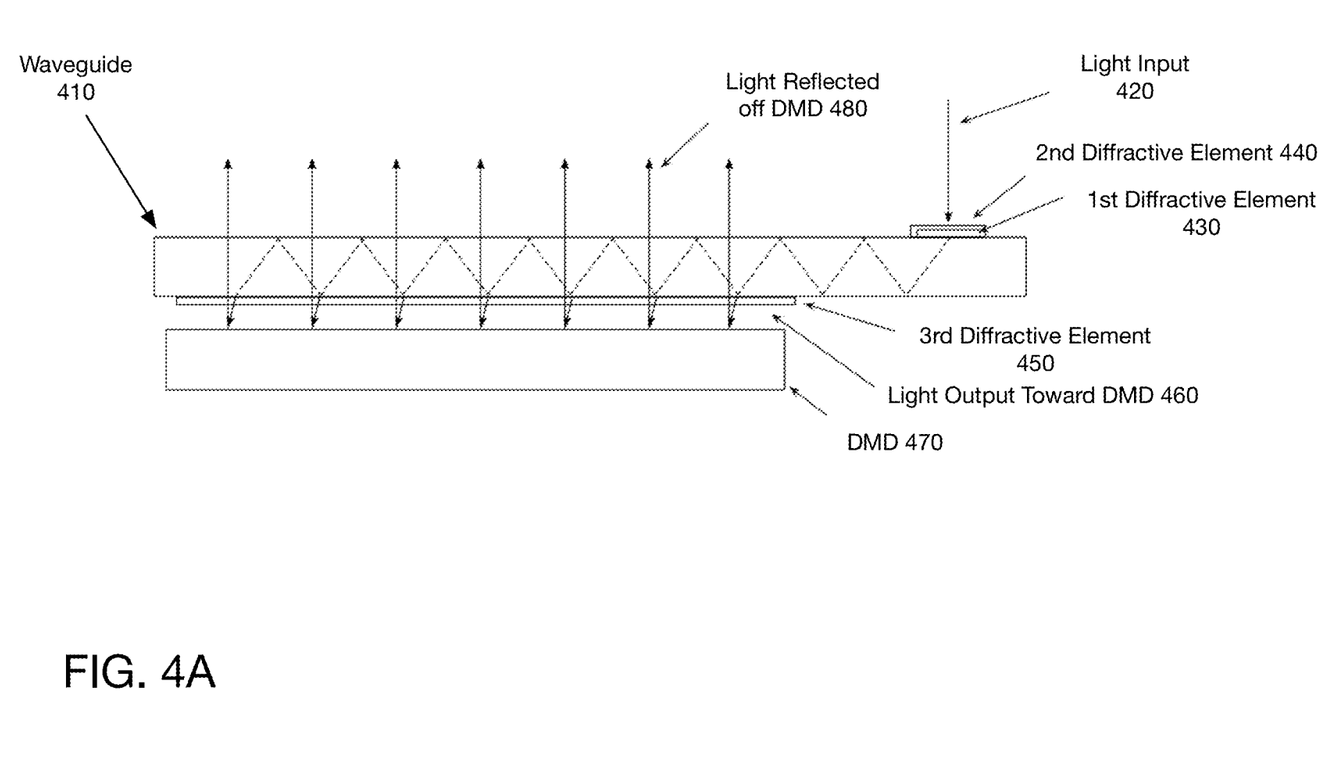
FIG. 4A is a side view of another embodiment of the waveguide including three gratings.

FIG. 4A illustrates another embodiment of the configuration with three diffractive elements. In this embodiment, the third diffractive element, out-coupler 450, is positioned on the bottom of waveguide 410. This diffractive element is a reflective element, rather than a transmissive element. In this configuration, the first diffractive element 430 in-couples the light input 420, and the second diffractive element 440 expands the light and directs it down the waveguide 410. The third diffractive element 450 out-couples the light to the DMD 470. The DMD 470 modulates the light and directs the modulated light 480 through waveguide 410 to the user's eye, optionally through other optics.

Figure 4B:
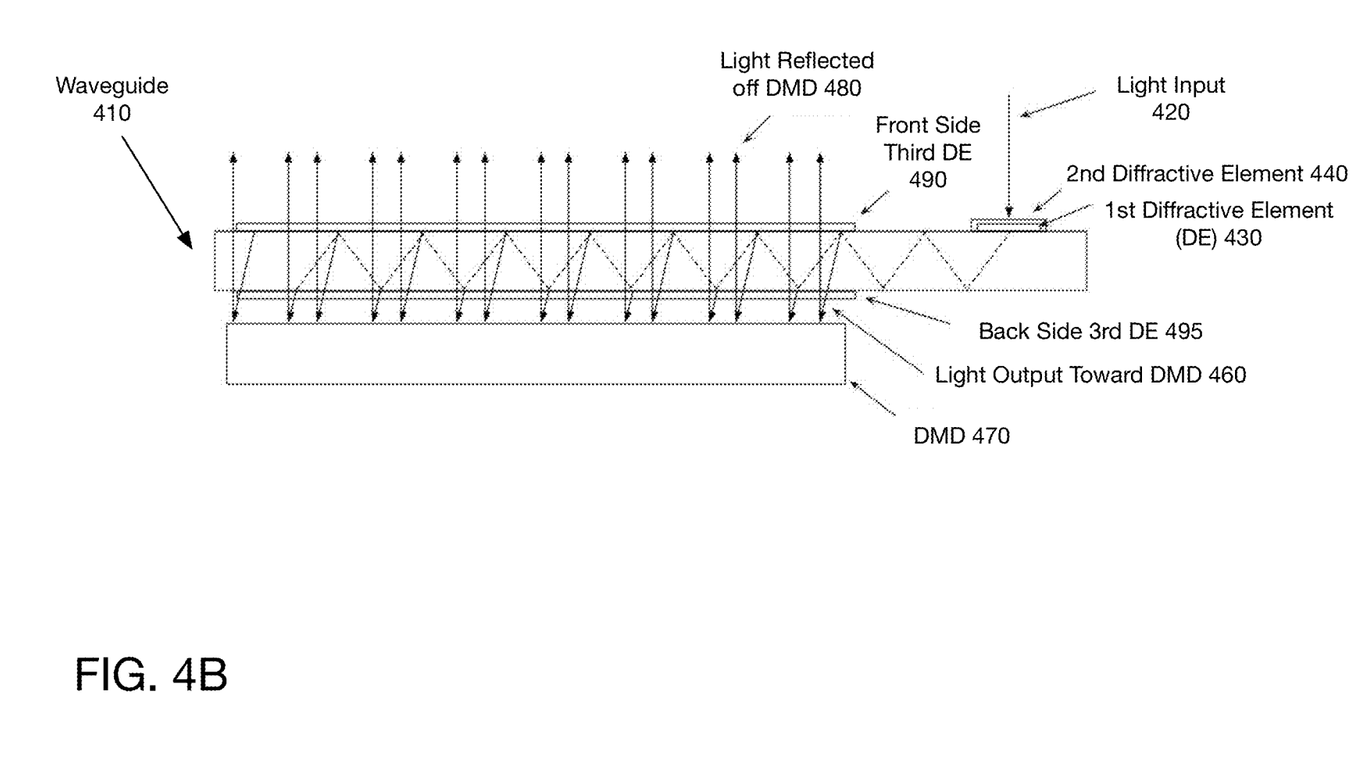
FIG. 4B is a side view of another embodiment of the waveguide including three gratings.

FIG. 4B illustrates another embodiment of waveguide, with four diffractive elements. This configuration is similar to the configuration with three diffractive elements, with an in-coupling first diffractive element 430 in-coupling the light input 420 into the waveguide 410. The second diffractive element 440 expands the light, as discussed above. The third diffractive element, the out-coupling diffractive element, is split between the front and the back of the waveguide 410. In this embodiment, the two parts of the third diffractive element 490, 495 are positioned on the top and the bottom of waveguide 410. Each portion of the third diffractive element 490, 495 out-couples a portion of the light 460 to the DMD 470. The modulated light from the DMD 480 passes through waveguide 410, to the user's eye. Utilizing a split out-coupler as shown in one embodiment increases uniformity of the light. In one embodiment, the out-couplers may be tuned to different wavelengths.

In one embodiment, all of the configurations shown may have the in-coupling diffractive element(s), expanding diffractive element(s), and out-coupling diffractive element(s) positioned on either side of the waveguide, or on both sides of the waveguide. Though for simplicity the illustration only shows one of these configurations for other embodiments, it should be understood that such variations may be applied to all configurations.

Figure 5:
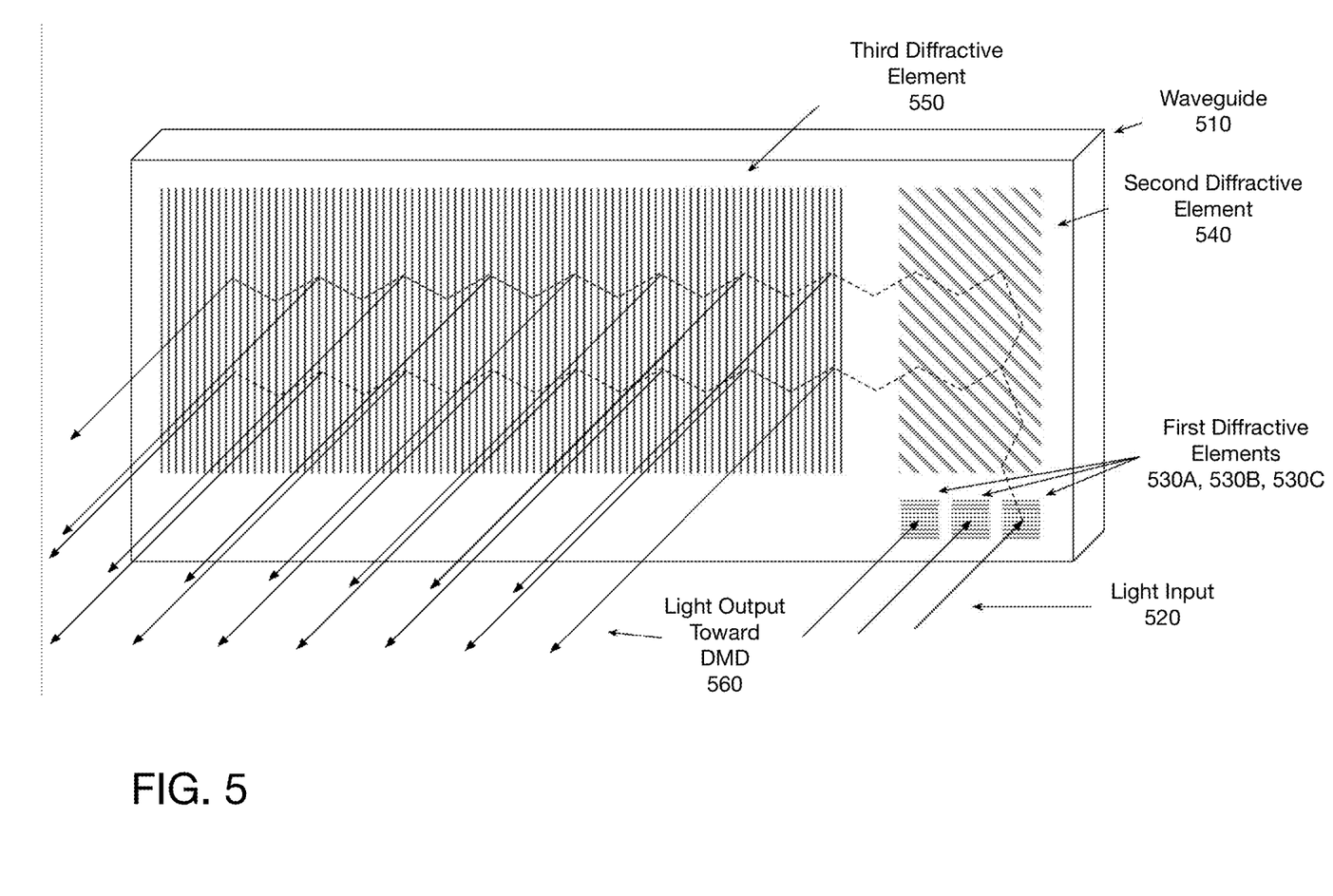
FIG. 5 is a top view of another embodiment of the waveguide, including five gratings.

FIG. 5 is a top view of another embodiment of the waveguide, including five diffractive elements. In this configuration, instead of a first in-coupling diffractive element, as shown in FIGS. 4A and 4B, there are three separate in-coupling diffractive elements 530A, 530B, and 530C, corresponding to different wavelengths coupled into the waveguide 510. This system expands on the previous systems but uses different input elements optimized for different wavelengths. In one embodiment these wavelengths correspond to red, green and blue light (RGB), the three colors, which are coupled into the waveguide 510. In one embodiment, each first diffractive element is optimized for the wavelength corresponding to its color. The second diffractive element 540 expands the light from all three light sources and directs it to the out-coupling third diffractive element 550, toward the DMD (not shown). As previously discussed, the light 460 is directed to the DMD from the waveguide 510, modulated, and then reflected through the waveguide 510 to the user's eyes.

Figure 6A:
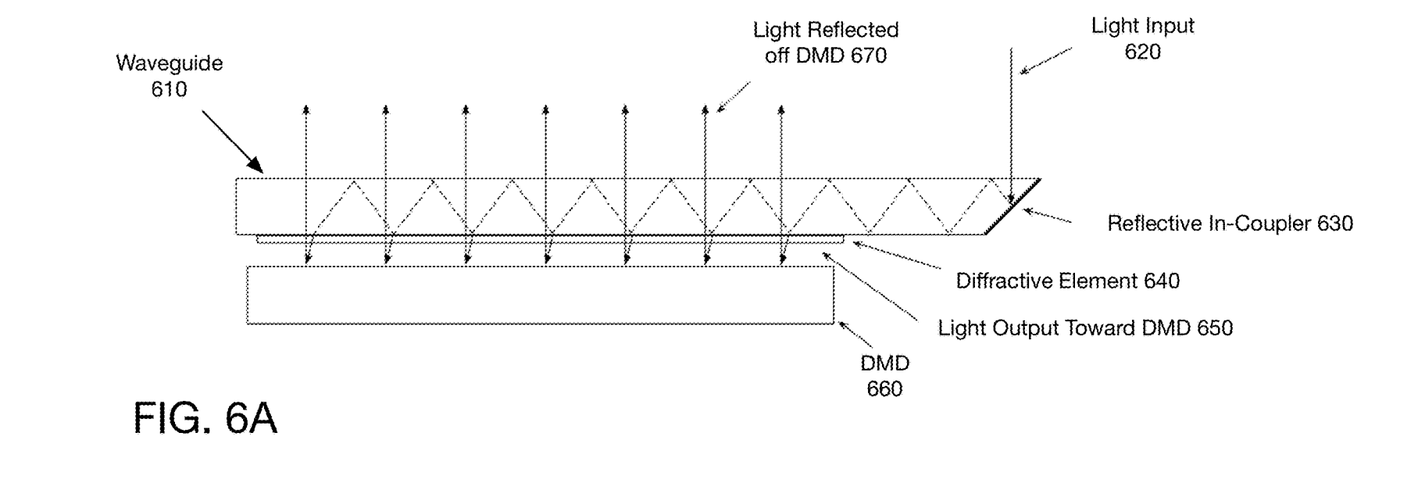
FIGS. 6A and 6B are side views of another embodiment of the waveguide, with a non-diffractive in-coupler.
Figure 6B:
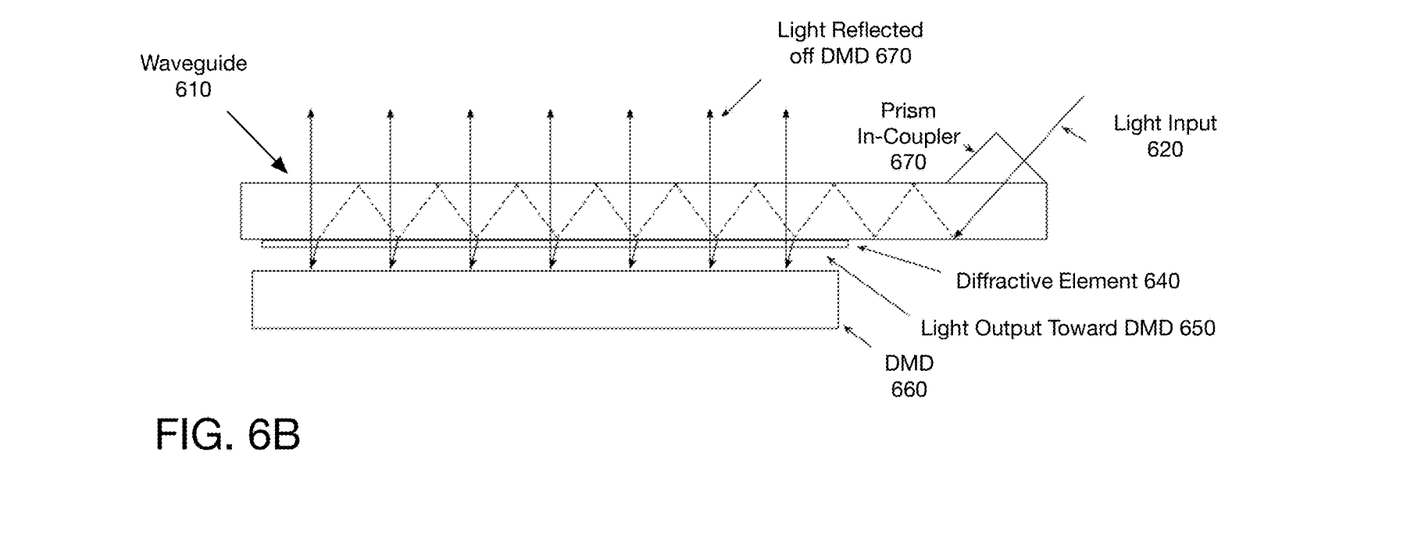

FIGS. 6A and 6B are side views of two additional embodiments of the waveguide with a non-diffractive in-coupler. In the waveguide 610 of FIGS. 6A and 6B, the first diffractive element or portion, which is for in-coupling the light into the waveguide 610, is replaced by a non-diffractive input coupler 630, 670. In one embodiment, the non-diffractive in-coupler is a reflective in-coupler 630. In one embodiment, the non-diffractive in-coupler is a prism structure 670. In one embodiment, the light 620 is coupled into the edge of the waveguide 610. Other non-diffractive input couplers may be used. In one embodiment, the waveguide may include a second diffractive element to expand the light, as described above. The diffractive element 640 out-couples the light 650 to DMD 660. The modulated light 670 from the DMD 660 is passed through waveguide 610. In this illustration, the diffractive element 640 is on the bottom surface of the waveguide 610. As noted above, the positioning of the diffractive elements may vary.

Figure 7:
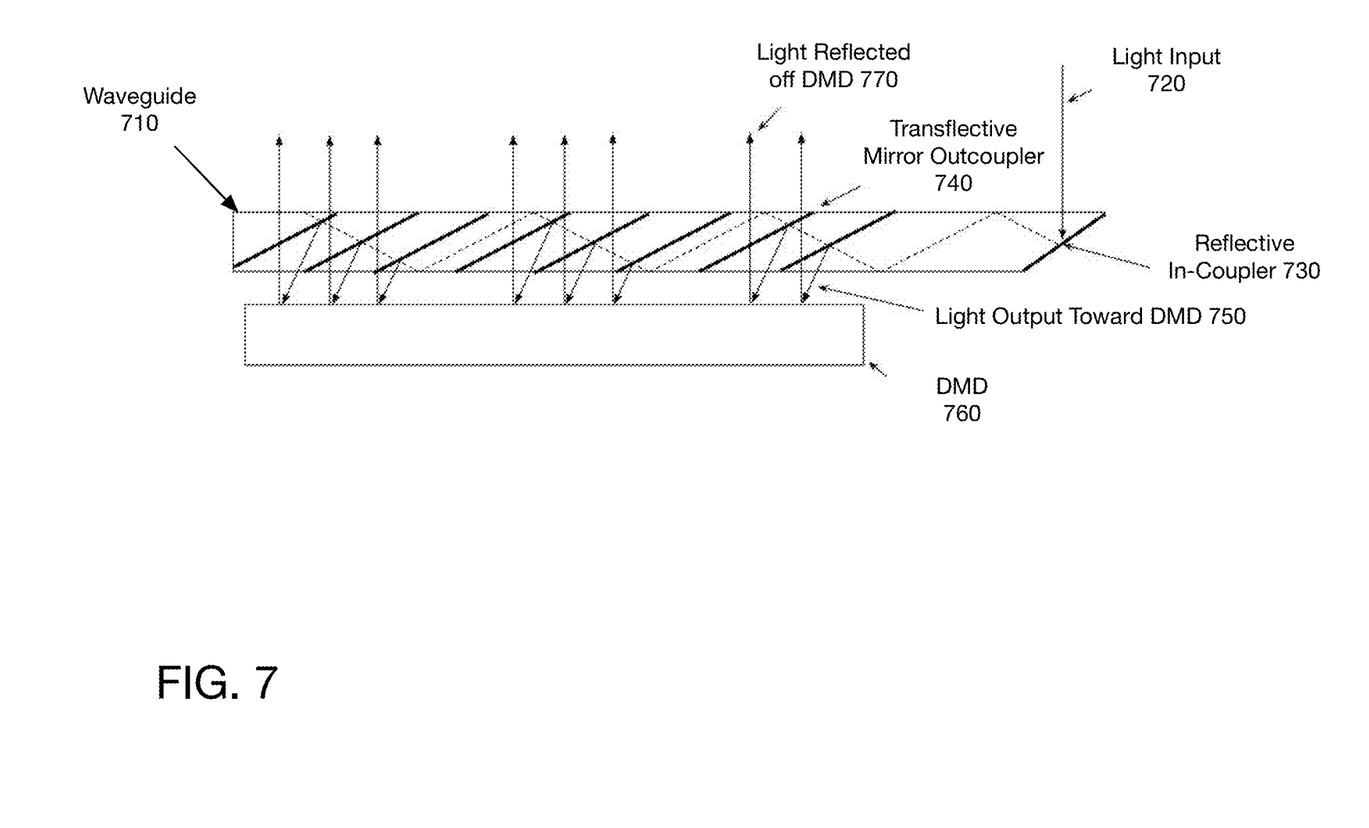
FIG. 7 is a side view of another embodiment of the waveguide with a non-diffractive in-coupler and a non-diffractive out-coupler.

FIG. 7 illustrates a fifth embodiment of the waveguide with a non-diffractive in-coupler and a non-diffractive out-coupler. This may be referred to as a geometric waveguide. In one embodiment, the non-diffractive in-coupler is a reflective in-coupler 730. In another embodiment, the non-diffractive in-coupler 730 may be a prism. In one embodiment, light 720 from a light source is coupled into the waveguide through a prism. In another embodiment, light 720 is coupled into the waveguide 710 through a reflective in-coupler 730, at the edge of the waveguide 710. Other types of in-couplers may also be used, without departing from the scope of the present disclosure.

The non-diffractive out-coupler 740, in one embodiment, is a transflective mirror out-coupler 740. In one embodiment, a geometric waveguide 710 with no diffractive elements is used to illuminate the micromirror display 760. The waveguide 710 includes an array of partially mirrored elements 740, which are transflective mirror out-couplers 740. In one embodiment, the mirrored elements 740 are evenly distributed through the out-coupling region of the waveguide 710. When light in the waveguide interacts with these elements 740, some (1-50%) of the light is reflected and exits the waveguide toward the DMD surface. The remainder of the light remains in the waveguide and may interact with additional elements 740 in the array of mirrored elements. In one embodiment, the mirrored elements 740 are polarization sensitive. In one embodiment, for polarization sensitive mirrored elements 740, a quarter wave plate is placed between the waveguide 710 and the DMD 760. This rotates the polarization of the light, so that light passing through the waveguide 710 to the DMD 760 is out-coupled by transflective mirrors 740, while light modulated by the DMD 760 passes through the waveguide without being in-coupled. In another embodiment, the mirrored elements 740 are not polarization sensitive. In one embodiment, the display is an LCOS display not a DMD.

One of skill in the art would understand that these configurations, in which diffractive in-couplers and out-couplers of the waveguide are replaced with non-diffractive in-couplers and/or out-couplers, may be applied to any of the configurations of the waveguide. A waveguide may have any one of the in-coupler and/or out-coupler and extended configurations and the configurations may be mixed and matched. Thus, one or more of the elements may be diffractive, and one or more of the elements may be positioned on either side of the waveguide, etc.

Figure 8:
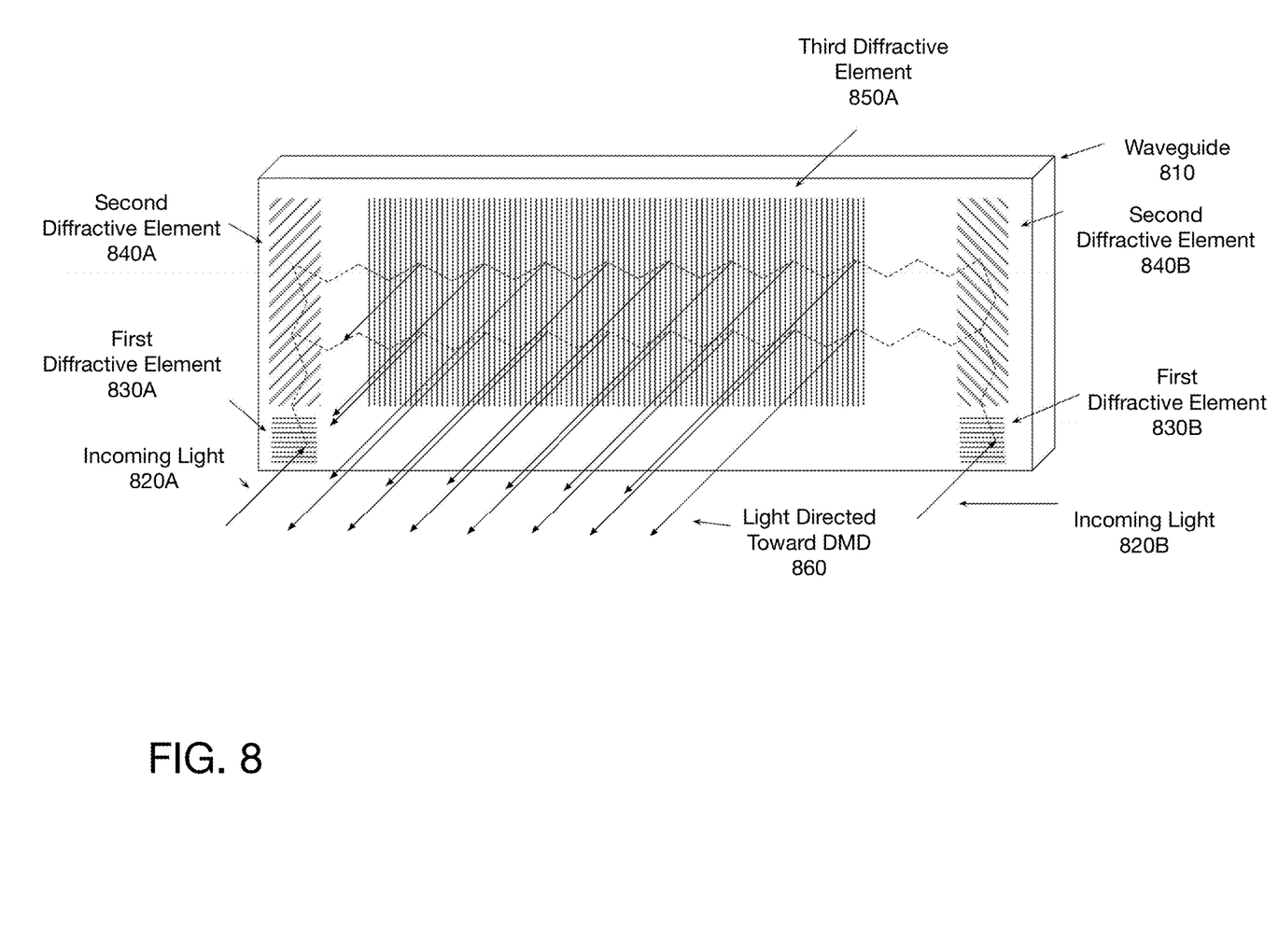
FIG. 8 is a top view of another embodiment of the waveguide including two sets of in-coupling diffractive elements, and a single out-coupling diffractive element.

FIG. 8 illustrates an embodiment in which the incoming light, and thus the incoming light in-coupler, and the light-expanding diffractive element are split. As can be seen, the waveguide 810 includes two incoming light sources, with incoming light 820A, 820B on opposite sides of the waveguide. Correspondingly, there are two "first" diffractive elements, 830A, 830B, and two second diffractive elements 840A, 840B. In this way, the light directed into the DMD 860 comes from two separate sources. Although only two sets of incoming lights are illustrated, one of skill in the art would understand that there may be more light sources, with associated diffractive elements, in this configuration. In one embodiment, the use of two incoming light sources enables the distribution of light in the system, reducing the size of the light sources, and may increase the evenness of the light across the DMD. In one embodiment, the two incoming light sources may be for a field display and a foveal display. In one embodiment, the field display and foveal display may be implemented in accordance with the description of U.S. Pat. No. 10,514,546.

The incoming light is directed by the second diffractive elements 840A, 840B through the waveguide 810. The third diffractive element 850 out-couples the light toward DMD 860. As noted above, the DMD modulates the light, and in one embodiment, reflects it back through the waveguide.

Figure 9:
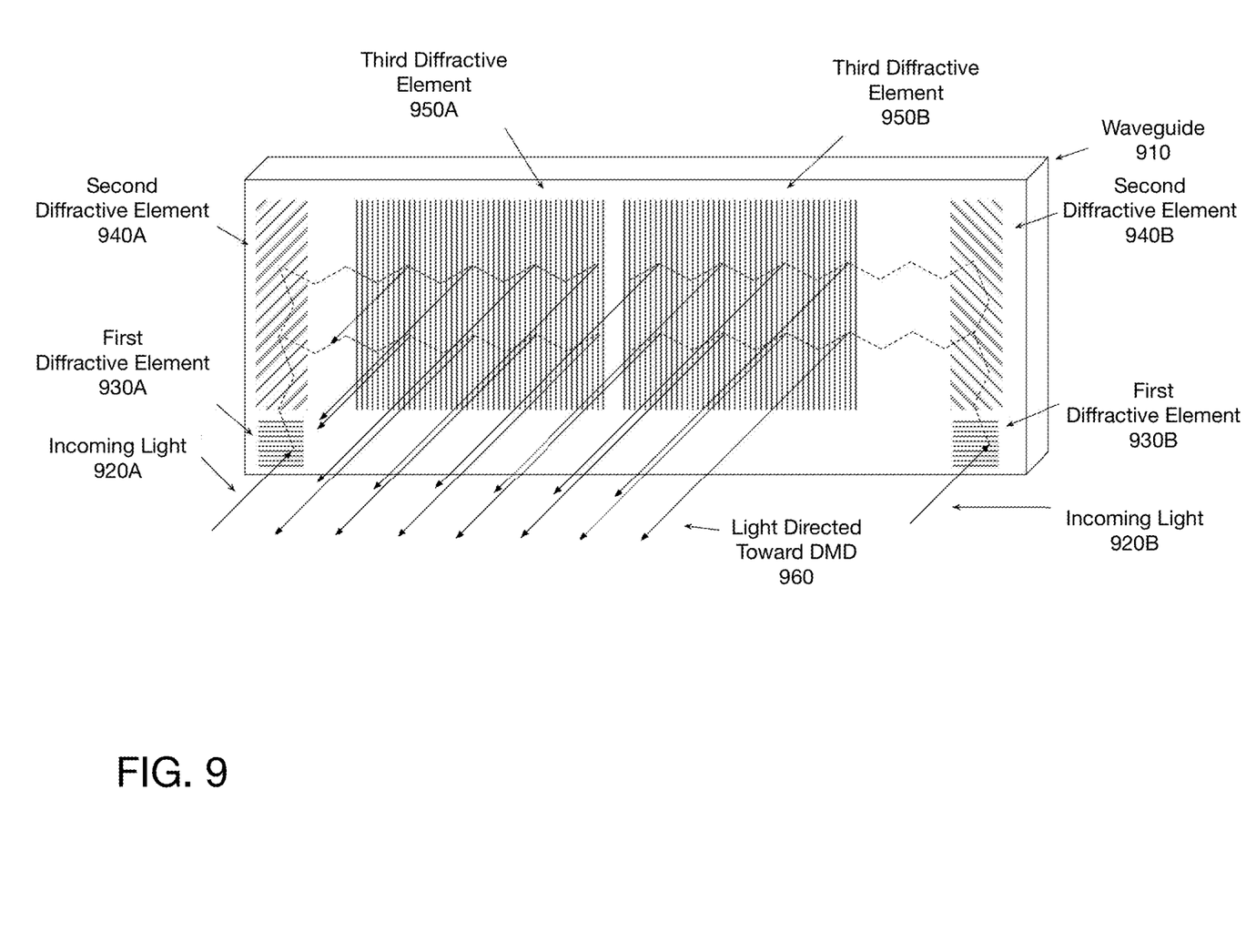
FIG. 9 is a top view of another embodiment of the waveguide including two sets of in-coupling diffractive elements, and two out-coupling diffractive elements.

FIG. 9 illustrates another embodiment in which the incoming light is split, and so is the out-coupled light. In this embodiment, the two incoming lights 920A, 920B, are directed toward the DMD from two separate out-coupling third diffractive elements 950A, 950B. This may enable the system to light up a portion of the DMD, rather than the entire DMD. Note that although the illustration shows a gap between the two portions of the third diffractive element 950A, 950B, in a real configuration there would not be such a gap, and the combination of the light from the third diffractive elements 950A, 950B would cover the entire DMD. The light in-coupled by the first diffractive elements 930A, 930B is expanded by the respective second diffractive elements 940A, 940B, and directed through waveguide 910. The out-couplers 950A, 950B out-couple their respective lights, directing the light 960 toward the DMD for modulation.

This configuration enables the system to illuminate a part of the DMD. This may be of interest when only a portion of the field of view has images for display. This may be particularly useful in augmented reality configurations, where the overlaid images do not cover the entire display area. In some embodiments, instead of having the display split in two, it may be split into quadrants, or even more portions. In some embodiments, the partial illumination may be split into even parts, or uneven parts.

Figure 10:
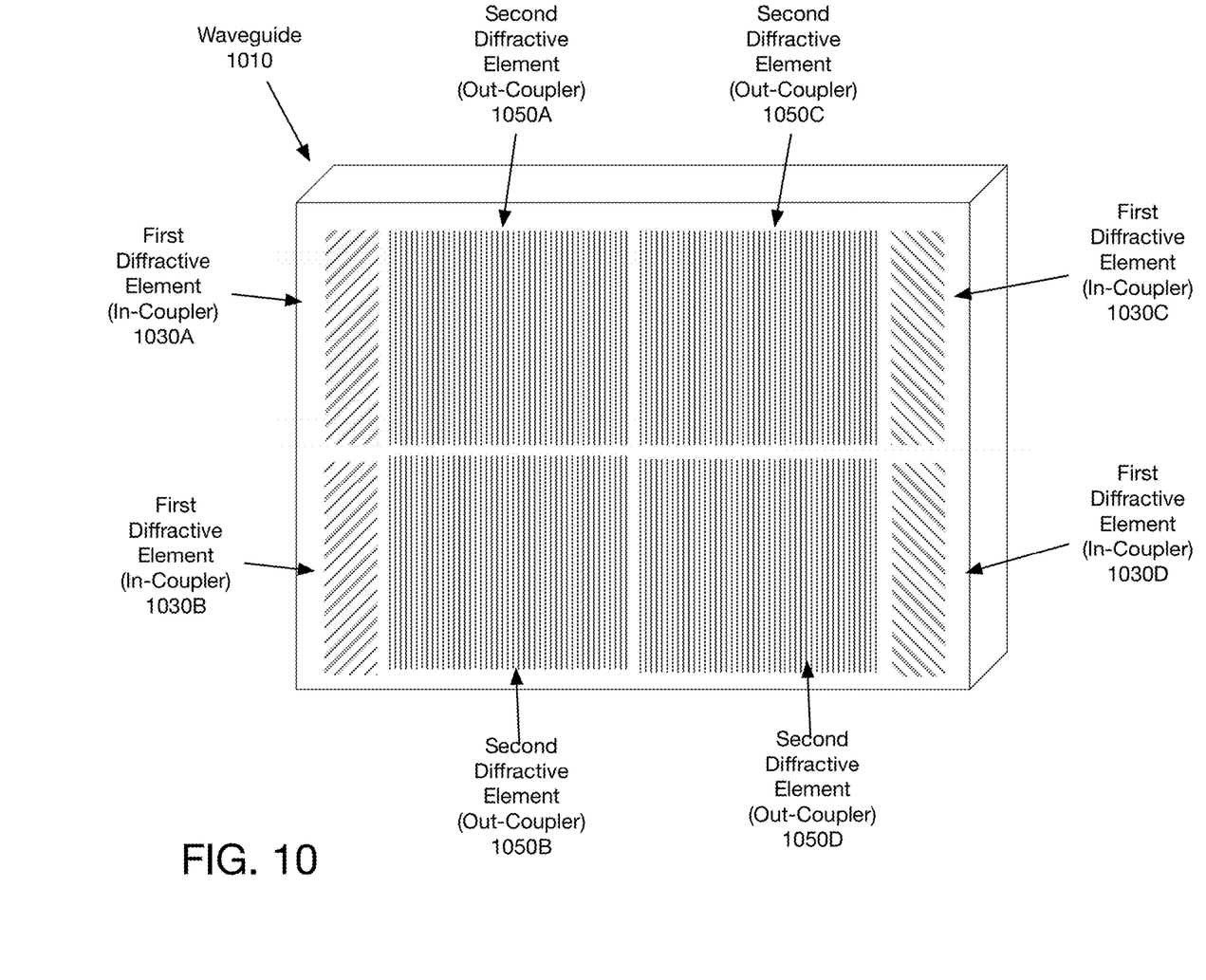
FIG. 10 illustrates another embodiment of a waveguide with four in-couplers and four out-couplers.

FIG. 10 illustrates one embodiment of a waveguide 1010 with four in-couplers 1030A, 1030B, 1030C, 1030D, associated with four incoming light sources 1020A-1020D (not shown). The light from each in-coupler 1030A-1030D is out-coupled through a separate diffractive element 1050A-1050D, or separate portions of a single diffractive element. In this way a portion of the DMD may be lit, when only a portion of the display area has virtual image data. In one embodiment, there may be an expander associated with each in-coupler (not shown), such that the in-couplers are relatively smaller. This allows the reduction of the size of the light, as noted above. In one embodiment, each of the lights in-coupled through in-couplers 1030A-1030D are RGB lights.

Figure 11:
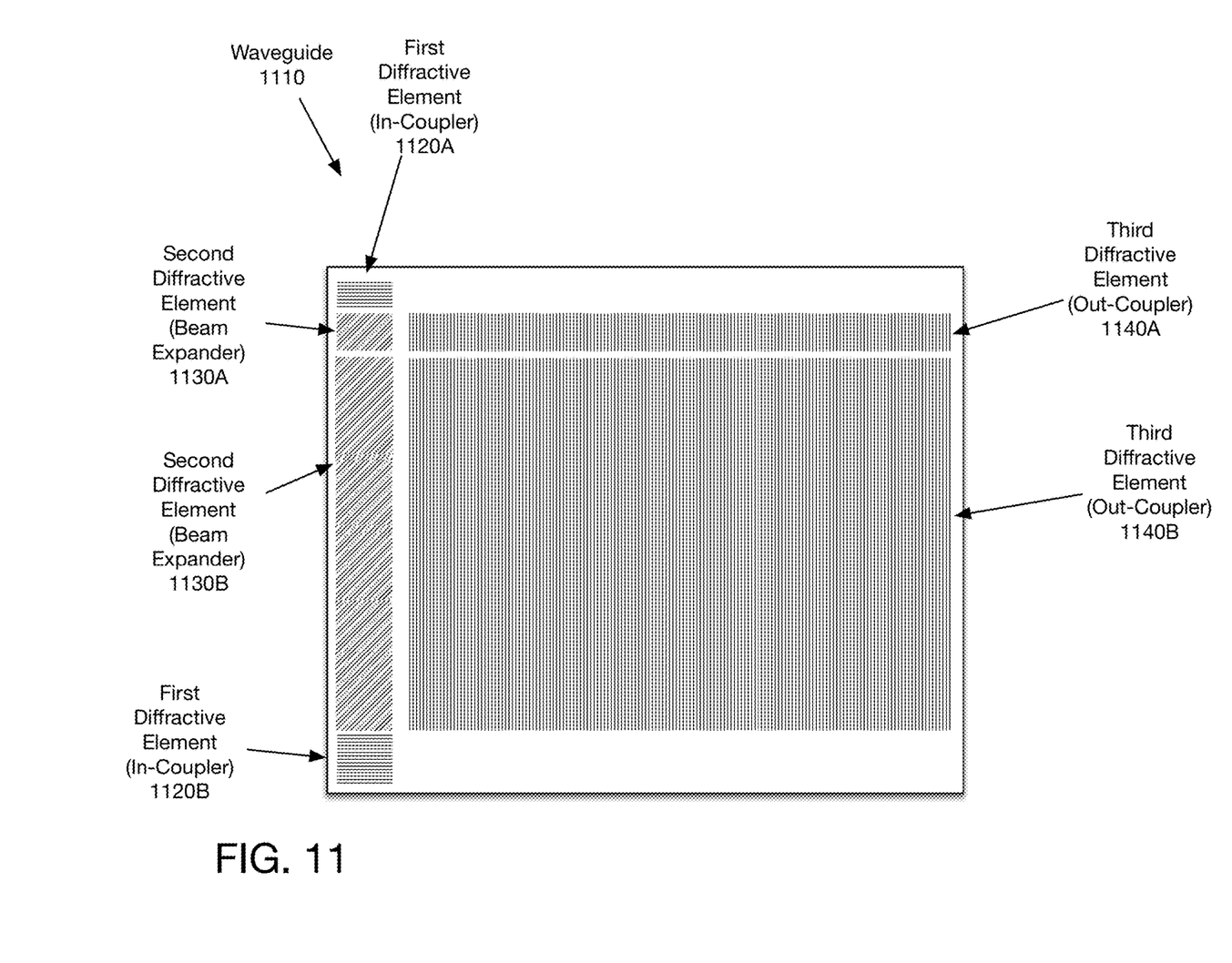
FIG. 11 illustrates another embodiment of a waveguide with two in-couplers and two out-couplers.

FIG. 11 illustrates another embodiment of a waveguide with two in-couplers and two out-couplers. In this embodiment, the two in-couplers 1120A, 1120B are on the same side of the waveguide 1110. The in-couplers 1120A, 1120B couple the light to the second diffractive elements, or expanders, 1130A, 1130B, in one embodiment. The expanders 1130A, 1130B direct the light through waveguide 1110, to out-couplers 1140A, 1140B. The out-couplers 1140A, 1140B out-couple the light toward a DMD (not shown). The light modulated by the DMD passes through the waveguide 1110, toward the user.

This configuration, in one embodiment, enables the differential use of light intensity, which may be useful for example to provide a heads-up display. There are many other uses for enabling differential display between portions of a DMD. Although in this example the in-couplers are on the same side of the waveguide, one of skill in the art would understand that they may be on different sides. Although in this example, the proportions between the first and second out-couplers 1140A, 1140B is approximately 1-to-10, the sizes may have any relationship.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A head-mounted display system comprising:
a light source;
a waveguide comprising:
  a first in-coupler, to in-couple a first light into the waveguide;
  a second in-coupler, to in-couple a second light;
  a first out-coupler, to out-couple the first light into the waveguide; and
  a second out-coupler, to out-couple the second light;
  wherein the first out-coupler and the second out-coupler are proximate and non-overlapping;
a spatial light modulator (SLM) to receive the first light and the second light from the waveguide via the first out-coupler and the second out-coupler, and to direct modulated light representing an image for display to a user;
wherein the first out-coupler and the second out-coupler illuminate separate portions of the SLM.

2. The system of claim 1, further comprising:
the first in-coupler comprising a first diffractive element;
a second diffractive element, the second diffractive element receiving the light from the first diffractive element, expanding the light, and directing the expanded light down the waveguide toward the first out-coupler; and
the first out-coupler comprising a third diffractive element.

3. The system of claim 1, wherein the first light and the second light comprise different wavelengths.

4. The system of claim 3, wherein the first in-coupler is optimized for a first set of wavelengths, and the second in-coupler is optimized for a second set of wavelengths.

5. The system of claim 1, wherein one or more of the first in-coupler, the second in-coupler, the first out-coupler, and the second out-coupler is a non-diffractive element.

6. The system of claim 5, wherein the non-diffractive element comprises a transflective mirror.

7. The system of claim 1, further comprising:
a third in-coupler and a fourth in-coupler, associated with a third out-coupler and a fourth out-coupler, such that a quarter of the SLM may be illuminated at a time.

8. The system of claim 1, wherein the first out-coupler a top out-coupling element on a top of the waveguide and the second out-coupler is a bottom out-coupling element on a bottom of the waveguide.

9. The system of claim 1, wherein the first out-coupler and the second out-coupler have different sizes.

10. The system of claim 1, wherein the modulated light passes through the waveguide before being directed toward the user.

11. The system of claim 1, wherein the light source is a non-collimated light source.

12. The system of claim 1, further comprising:
fiberoptics to redirect the light.

13. A head-mounted display system comprising:
a non-collimated light source;
a waveguide including a first in-coupler and a first out-coupler to transmit non-collimated light, wherein one or more of the first in-coupler and the first out-coupler are non-diffractive, the waveguide further including a second in-coupler and a second out-coupler; and
a spatial light modulator (SLM) to receive the non-collimated light from the waveguide via the first out-coupler, and to direct modulated, non-collimated light through the waveguide, the modulated, non-collimated light representing an image for display to a user, the modulated, non-collimated light passing through the waveguide before being directed toward the user;
wherein the first out-coupler and the second out-coupler illuminate separate portions of the SLM.

14. The system of claim 13, wherein the first out-coupler and the second out-coupler have different sizes.

15. The system of claim 13, wherein the first out-coupler is a top out-coupling element on a top of the waveguide and the second out-coupler is a bottom out-coupling element on a bottom of the waveguide.

16. The system of claim 13, wherein one or more of the first in-coupler and the first out-coupler comprises a non-diffractive element, the non-diffractive element comprising one of: transflective mirror, a prism, and a reflective element.

17. A head-mounted display system comprising:
a non-collimated light source;
a waveguide including a first in-coupler and a first out-coupler to transmit non-collimated light;
the waveguide including a second out-coupler, wherein the first out-coupler and the second out-coupler are different sizes;
a spatial light modulator (SLM) to receive the non-collimated light and to direct modulated, non-collimated light through the waveguide, the modulated, non-collimated light representing an image for display to a user, the modulated, non-collimated light passing through the waveguide before being directed toward the user.

18. The system of claim 17, further comprising:
the waveguide further including a second in-coupler;
wherein the first out-coupler and the second out-coupler illuminate separate portions of the SLM.

19. The system of claim 18, wherein one or more of the first in-coupler, the second in-coupler, the first out-coupler, and the second out-coupler is a non-diffractive element.

20. The system of claim 17, further comprising:
the waveguide further comprising a second in-coupler wherein a first light in-coupled into the first in-coupler, and a second light in-coupled into the second in-coupler comprise different wavelengths.

* * * * *